US011868287B2

(12) United States Patent
Lam et al.

(10) Patent No.: US 11,868,287 B2
(45) Date of Patent: Jan. 9, 2024

(54) JUST-IN-TIME (JIT) SCHEDULER FOR MEMORY SUBSYSTEMS

(71) Applicant: Micron Technology, Inc., Boise, ID (US)

(72) Inventors: Johnny A Lam, Firestone, CO (US); Alex J. Wesenberg, Erie, CO (US); Guanying Wu, Longmont, CO (US); Sanjay Subbarao, Irvine, CA (US); Chandra Guda, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 122 days.

(21) Appl. No.: 17/407,411

(22) Filed: Aug. 20, 2021

(65) Prior Publication Data

US 2022/0197837 A1 Jun. 23, 2022

Related U.S. Application Data

(60) Provisional application No. 63/126,821, filed on Dec. 17, 2020.

(51) Int. Cl.

| | |
|---|---|
| ***G06F 13/00*** | (2006.01) |
| ***G06F 13/16*** | (2006.01) |
| ***G06F 9/50*** | (2006.01) |
| ***G06F 13/37*** | (2006.01) |

(52) U.S. Cl.

CPC ........ *G06F 13/1673* (2013.01); *G06F 9/5016* (2013.01); *G06F 13/161* (2013.01); *G06F 13/37* (2013.01); *G06F 2209/503* (2013.01); *G06F 2209/5011* (2013.01)

(58) Field of Classification Search

CPC .... G06F 13/1673; G06F 13/161; G06F 13/37; G06F 9/5016; G06F 12/00; G06F 13/00

See application file for complete search history.

(56) References Cited

U.S. PATENT DOCUMENTS

| | | | |
|---|---|---|---|
| 8,504,691 | B1 | 8/2013 | Tobler |
| 10,216,660 | B1 | 2/2019 | Jonnala et al. |
| 10,268,419 | B1 | 4/2019 | Tylik et al. |

(Continued)

OTHER PUBLICATIONS

USPTO, Final Office Action for U.S. Appl. No. 17/407,396, dated Dec. 9, 2022.

(Continued)

*Primary Examiner* — Tuan V Thai

(74) *Attorney, Agent, or Firm* — Lowenstein Sandler LLP

(57) ABSTRACT

The memory sub-systems of the present disclosure discloses a just-in-time (JIT) scheduling system and method. In one embodiment, a system receives a request to perform a memory operation using a hardware resource associated with a memory device. The system identifies a traffic class corresponding to the memory operation. The system determines a number of available quality of service (QoS) credits for the traffic class during a current scheduling time frame. The system determines a number of QoS credits associated with a type of the memory operation. Responsive to determining the number of QoS credits associated with the type of the memory operation is less than the number of available QoS credits, the system submits the memory operation to be processed at a memory device.

18 Claims, 14 Drawing Sheets

(56) References Cited

U.S. PATENT DOCUMENTS

| | | | | |
|---|---|---|---|---|
| 2002/0169947 | A1* | 11/2002 | Bilardi | G06F 9/383 712/225 |
| 2007/0223504 | A1 | 9/2007 | Jain et al. | |
| 2015/0071074 | A1 | 3/2015 | Zaidi et al. | |
| 2015/0100963 | A1 | 4/2015 | Govindarajeswaran et al. | |
| 2015/0296049 | A1 | 10/2015 | Green et al. | |
| 2017/0315914 | A1 | 11/2017 | Muralimanohar et al. | |
| 2017/0351555 | A1 | 12/2017 | Coffin | |
| 2018/0275923 | A1* | 9/2018 | Earhart | G06F 3/0604 |
| 2019/0278515 | A1 | 9/2019 | Wells et al. | |
| 2019/0347033 | A1 | 11/2019 | Wei et al. | |
| 2020/0326890 | A1 | 10/2020 | Benisty | |
| 2020/0334163 | A1 | 10/2020 | Shergill et al. | |
| 2021/0191650 | A1 | 6/2021 | Vansteenkiste et al. | |
| 2021/0326141 | A1 | 10/2021 | Tran | |
| 2021/0373955 | A1 | 12/2021 | Galles et al. | |
| 2022/0050633 | A1 | 2/2022 | Pream | |
| 2022/0100561 | A1 | 3/2022 | Zhao | |
| 2022/0334877 | A1* | 10/2022 | Knierim | G06F 9/5083 |

OTHER PUBLICATIONS

USPTO, Office Action for U.S. Appl. No. 17/407,396, dated Aug. 29, 2022.

Yoo, Sangjin, and Dongkun Shin. "Reinforcement {Learning-Based}{SLC} Cache Technique for Enhancing {SSD} Write Performance." In 12th USENIX Workshop on Hot Topics in Storage and File Systems (HotStorage 20). 2020. (Year: 2020).

Y. Qian, X. Li, S. Ihara, L. Zeng, J. Kaiser, T. Sur.., and A. Brinkmann. A configurable rule based classful token bucket filter network request scheduler for the lustre file system. In Proceedings of the International Conference for High Performance Computing, Networking, Storage and Analysis (SC '17). (Year: 2017).

R. Stoica, R. Pletka, N. Papandreou, N. Ioannou, S. Tamie, H. Pozidis, "Enabling 3D QLC NANO flash", Flash Memory Summit 2019, Santa Clara, CA. (Year: 2019).

Q. Zhang, D. Feng, F. Wang and Y. Xie, "An Efficient, QoS-Aware 1/0 Scheduler for Solid State Drive," 2013 IEEE 10th International Conference on High Performance Computing and Communications & 2013 IEEE International Conference on Embedded and Ubiquitous Computing, 2013, pp. 1408-1415. (Year: 2013).

Y. Ohba, "QLWFQ: a queue length based weighted fair queueing algorithm in ATM networks," Proceedings of INFOCOM '97, 1997, pp. 566-575 vol. 2, doi: 10.1109/INFCOM.1997.644507. (Year: 1997).

T. Roy, J. Gupta, K. Kant, A. Pal and D. Minturn, "PLMlight: Emulating Predictable Latency Mode in Regular SSDs," 2021 IEEE 20th International Symposium on Network Computing and Applications (NCA), 2021, pp. 1-8, doi: 10.1109/NCA53618.2021.9685772. (Year: 2021).

Advisory Action for U.S. Appl. No. 17/407,396, dated Feb. 21, 2023, 3 pages.

Gries M., et al., "Modeling a Shared Medium Access Node with QoS Distinction," Computer Engineering and Networks Laboratory (TIK), TIK-Report 86, 2000, pp. 1-41.

Non-Final Office Action for U.S. Appl. No. 17/407,396, dated Mar. 3, 2023, 27 Pages.

USPTO, Final Office Action for U.S. Appl. No. 17/407,396, dated Jun. 26, 2023.

* cited by examiner

809

| Mem.Ops. Type / Traffic Class | SLC_READ | SLC_WRITE | QLC_LP_WRITE | QLC_UPXP_WRITE | QLC_TP_WRITE | ... |
|---|---|---|---|---|---|---|
| JIT_HOST_READ | x nsec | ... | ... | ... | ... | ... |
| JIT_HOST_WRITE | y nsec | ... | ... | ... | ... | ... |
| JIT_BACKGROUND_READ | z nsec | ... | ... | ... | ... | ... |
| JIT_BACKGROUND_WRITE | u nsec | ... | ... | ... | ... | ... |
| JIT_BACKGROUND_ERASE | v nsec | ... | ... | ... | ... | ... |
| ... | ... | ... | ... | ... | ... | ... |

FIG. 9

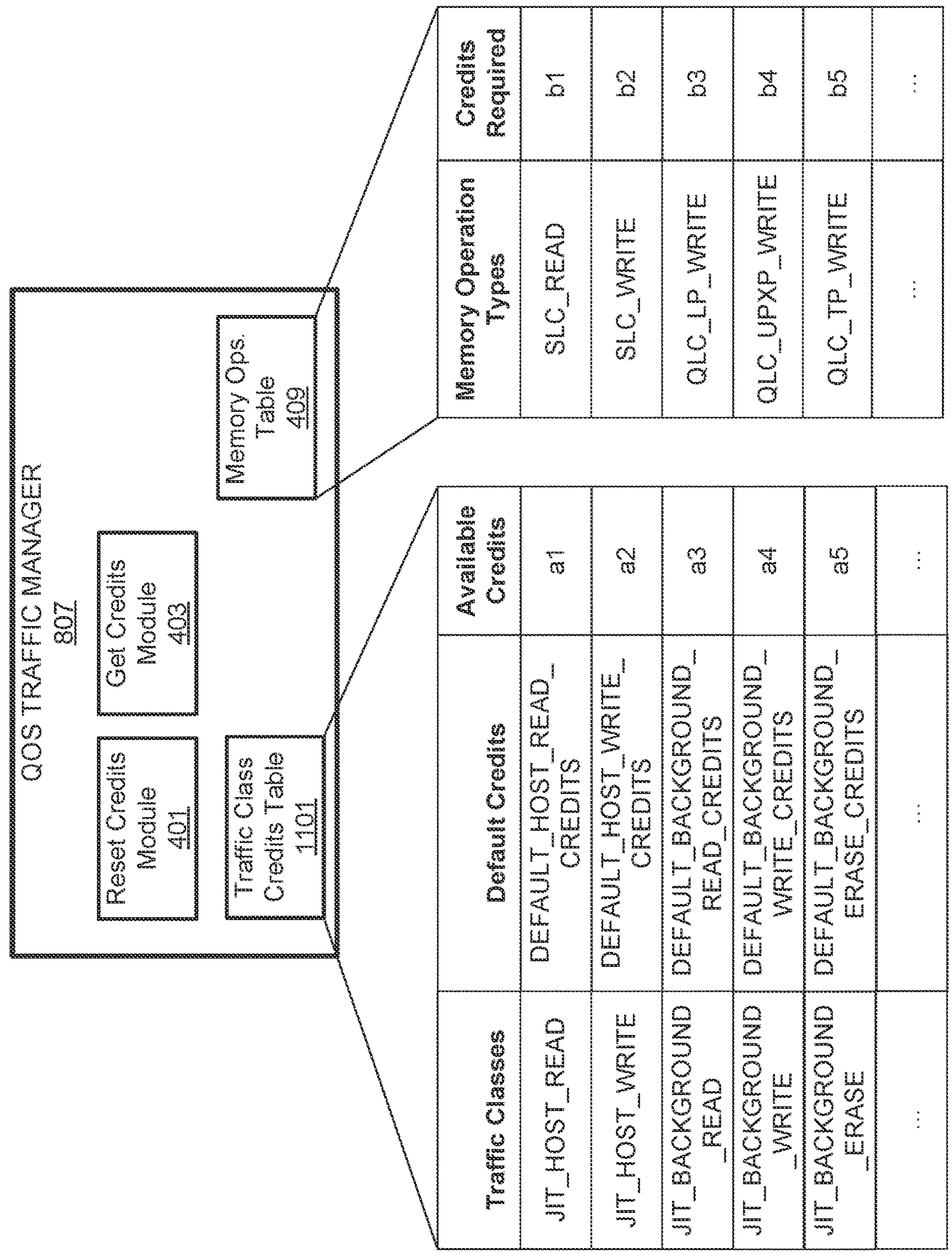

| Traffic Classes | Default Credits | Available Credits |
|---|---|---|
| JIT_HOST_READ | DEFAULT_HOST_READ_CREDITS | a1 |
| JIT_HOST_WRITE | DEFAULT_HOST_WRITE_CREDITS | a2 |
| JIT_BACKGROUND_READ | DEFAULT_BACKGROUND_READ_CREDITS | a3 |
| JIT_BACKGROUND_WRITE | DEFAULT_BACKGROUND_WRITE_CREDITS | a4 |
| JIT_BACKGROUND_ERASE | DEFAULT_BACKGROUND_ERASE_CREDITS | a5 |
| ... | ... | ... |

| Memory Operation Types | Credits Required |
|---|---|
| SLC_READ | b1 |
| SLC_WRITE | b2 |
| QLC_LP_WRITE | b3 |
| QLC_UPXP_WRITE | b4 |
| QLC_TP_WRITE | b5 |
| ... | ... |

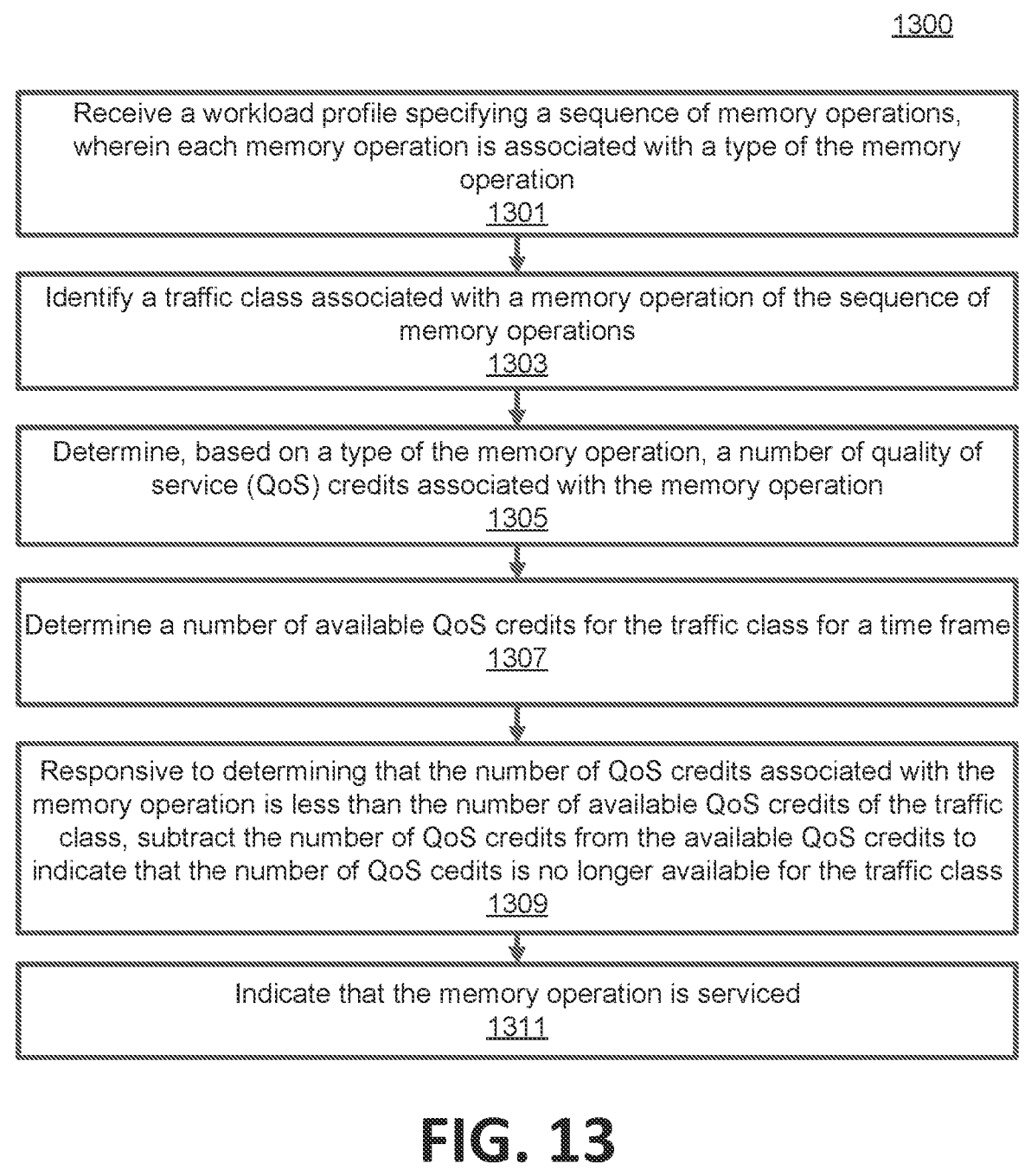

Receive a workload profile specifying a sequence of memory operations, wherein each memory operation is associated with a type of the memory operation
1301

Identify a traffic class associated with a memory operation of the sequence of memory operations
1303

Determine, based on a type of the memory operation, a number of quality of service (QoS) credits associated with the memory operation
1305

Determine a number of available QoS credits for the traffic class for a time frame
1307

Responsive to determining that the number of QoS credits associated with the memory operation is less than the number of available QoS credits of the traffic class, subtract the number of QoS credits from the available QoS credits to indicate that the number of QoS cedits is no longer available for the traffic class
1309

Indicate that the memory operation is serviced
1311

FIG. 13

JUST-IN-TIME (JIT) SCHEDULER FOR MEMORY SUBSYSTEMS

CROSS-REFERENCE TO RELATED APPLICATION

This application claims the benefit of U.S. Provisional Application No. 63/126,821, title "JUST-IN-TIME (JIT) SCHEDULER FOR MEMORY SUBSYSTEMS," filed Dec. 17, 2020, which is incorporated herein in its entirety.

TECHNICAL FIELD

Embodiments of the disclosure relate generally to memory sub-systems, and more specifically, relate to a just-in-time (JIT) scheduler for memory subsystems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 9 illustrates a latency profile according to an embodiment.

FIG. 11 illustrates a block diagram of a quality of service (QoS) traffic manager according to an embodiment.

FIG. 13 is a flow diagram of an example method to schedule a memory operation according to an embodiment.

DETAILED DESCRIPTION

Figure 1:
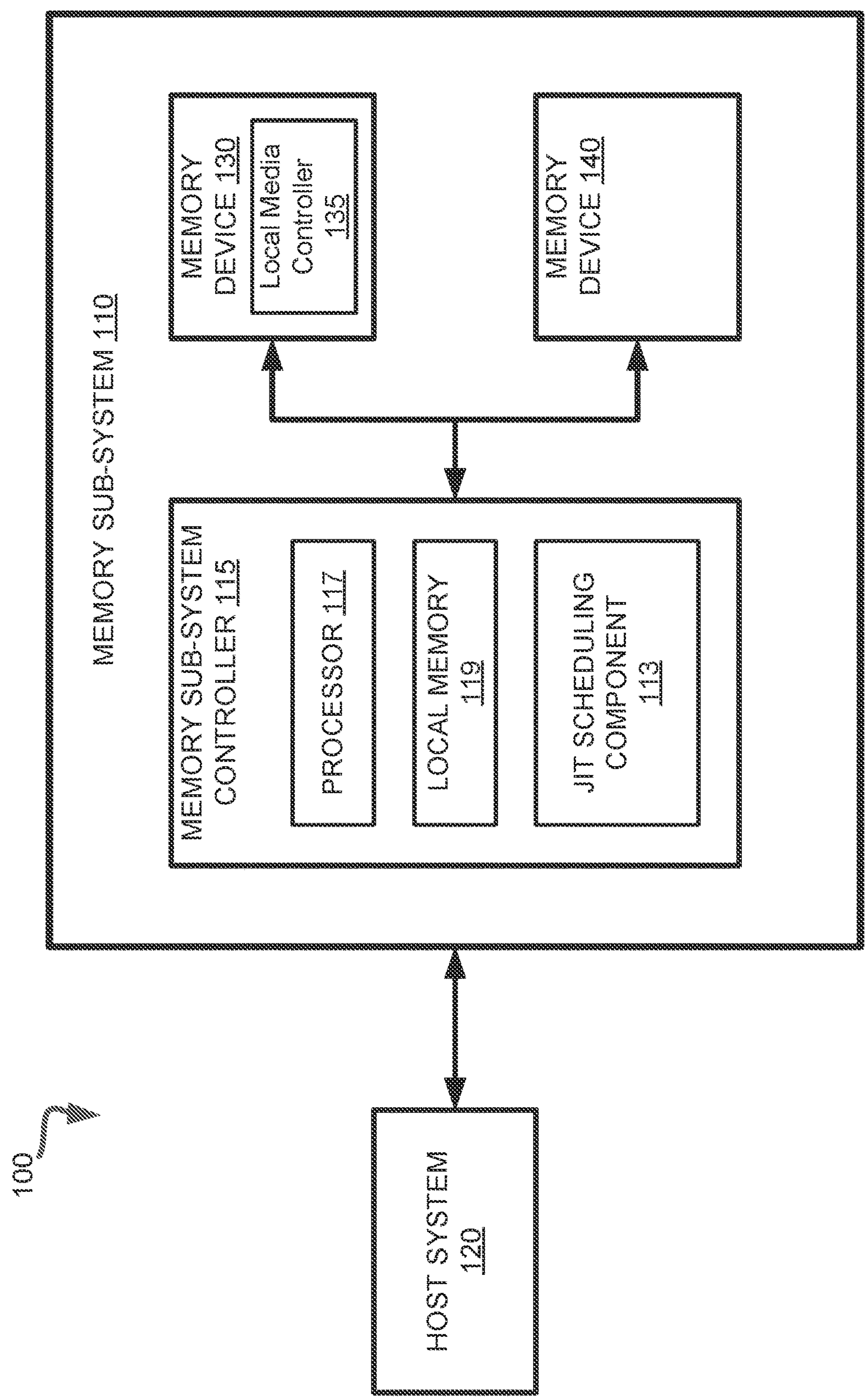
FIG. 1 illustrates an example computing system that includes a memory sub-system according to some embodiments.

Aspects of the present disclosure are directed to a just-in-time scheduler for memory subsystems. A memory subsystem can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory controller of a memory subsystem can perform different types of memory access operations, such as host-initiated memory access operations and background (memory-controller initiated) memory access operations. The background operations can temporarily render the memory sub-system unavailable to the host system. The background operations can include media management operations, such as wear leveling operations, garbage collection operations, error detection and error-correcting code (ECC) operations, and encryption operations, etc. In other cases, prioritizing the host-initiated memory access operations can starve the background memory access operations. In some cases, multiple memory operations can attempt to access the same die within overlapping periods of time, which can lead to die contention. In other cases, multiple memory operations can direct their outputs to the same memory buffer, which can lead to head-of-line blocking at the memory buffer. Die contention and head-of-line blocking may contribute to increasing the memory command latency.

An example memory sub-system of the present disclosure addresses the above and other deficiencies by implementing a JIT scheduling component, which manages buffer allocations, data transfers, and memory operation submissions from a frontend (flash translation layer (FTL) firmware) to the memory sub-system backend (e.g., memory devices). The JIT scheduler can process requests from the frontend, via a cursor. A cursor refers to a module between the frontend and the backend that can be used to keep track of a physical memory address for a next block or page that is to be written to a NAND device. The JIT scheduler can allocate data buffers and communicate with a host system to retrieve data from the host system. The JIT scheduler can use multiple scheduling pools to ensure that blocking does not occur with regards to data transfers with the host system or with the backend resources. The multiple scheduling pools can prioritize the requests by classifying the request into one or more traffic classes. Traffic classification is a process to categorize the traffic according to various parameters, such as the origination or type of the traffic. Some traffic classes include host read, host write, and background operations.

An example memory sub-system can include a quality of service (QoS) traffic manager, which can be employed to maintain a number of available QoS credits for each traffic class for any given scheduling time frame. A QoS credit refers to a unit of count for a QoS counting mechanism. E.g., one or more QoS credits can be used from the available QoS credits of a corresponding traffic class when the memory controller processes a memory operation. QoS credits can be used as a counting mechanism to manage the number of outstanding memory operations per traffic class for any given scheduling time frame without starving a lower priority traffic class. QoS credits can represent a timing, power, or a thermal load of the memory operation. The JIT scheduler can identify a traffic class for the memory operation. The JIT scheduler can request QoS credits from QoS Traffic manager for the traffic class. Based on a response from the request (success or failure), the JIT scheduler can determine if the memory operation can be sent to the backend memory devices or if the memory operation should remain in a scheduling pool until the next available scheduling time frame. The QoS traffic manager reduces the expected host command latency by ensuring that a minimum number of each traffic class are being sent to the backend memory devices in the given scheduling time frame without starving a lower priority traffic class.

An example memory sub-system can include a backend resource manager module. The JIT scheduler can query the backend resource manager to determine whether backend hardware resources (parallelizable hardware memory resources) are available to complete a request for any given time. Parallelizable backend resources refer to the memory devices and/or process units that the memory controller can access simultaneously.

A memory resource (or backend resource) for memory devices can be a parallelizable NAND unit, e.g., a NAND unit (e.g., NAND Die, a NAND plane, a block, or a page), or the memory resource can be a parallelizable controller-specific resource, e.g., a logical command processor (LCP), etc. An LCP can be implemented by the memory controller for processing incoming commands in one or more data buses. For example, a NAND device with 16 channels can have 16 available LCPs, where each channel has one LCP. A backend resource can be hardware architecture specific. By identifying backend resource availability, the backend resource manager can improve a worst case host command latency by reducing memory resource contentions.

It is desirable to know the effects at a system level performance for various workloads submitted to the JIT scheduling component. An example simulator can include a JIT scheduler and a QoS traffic manager of the JIT scheduling component to simulate the scheduling of different workloads, where a workload includes a sequence of incoming commands. The simulator can simulate various expected latencies for various requests for various workloads to tune the various default values of the QoS credits used by the QoS traffic manager, as discussed further below.

Various aspects of the above referenced methods and systems are described in details herein below by way of examples, rather than by way of limitation.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

The memory sub-system 110 can include a JIT scheduling component 113 that can manage buffer allocation, data transfer, and backend memory operations that are submitted by the flash translation layer (FTL) firmware to the backend memory devices. The FTL firmware refers to the module that maps logical block addresses of the host side to physical addresses of the memory devices. In some embodiments, the memory sub-system controller 115 includes at least a portion of the JIT scheduling component 113. In some embodiments, the JIT scheduling component 113 is part of the host system 110, an application, or an operating system. In other embodiments, local media controller 135 includes at least a portion of JIT scheduling component 113 and is configured to perform the functionality described herein. Further details with regards to the operations of the JIT scheduling component 113 are described below.

Figure 2:
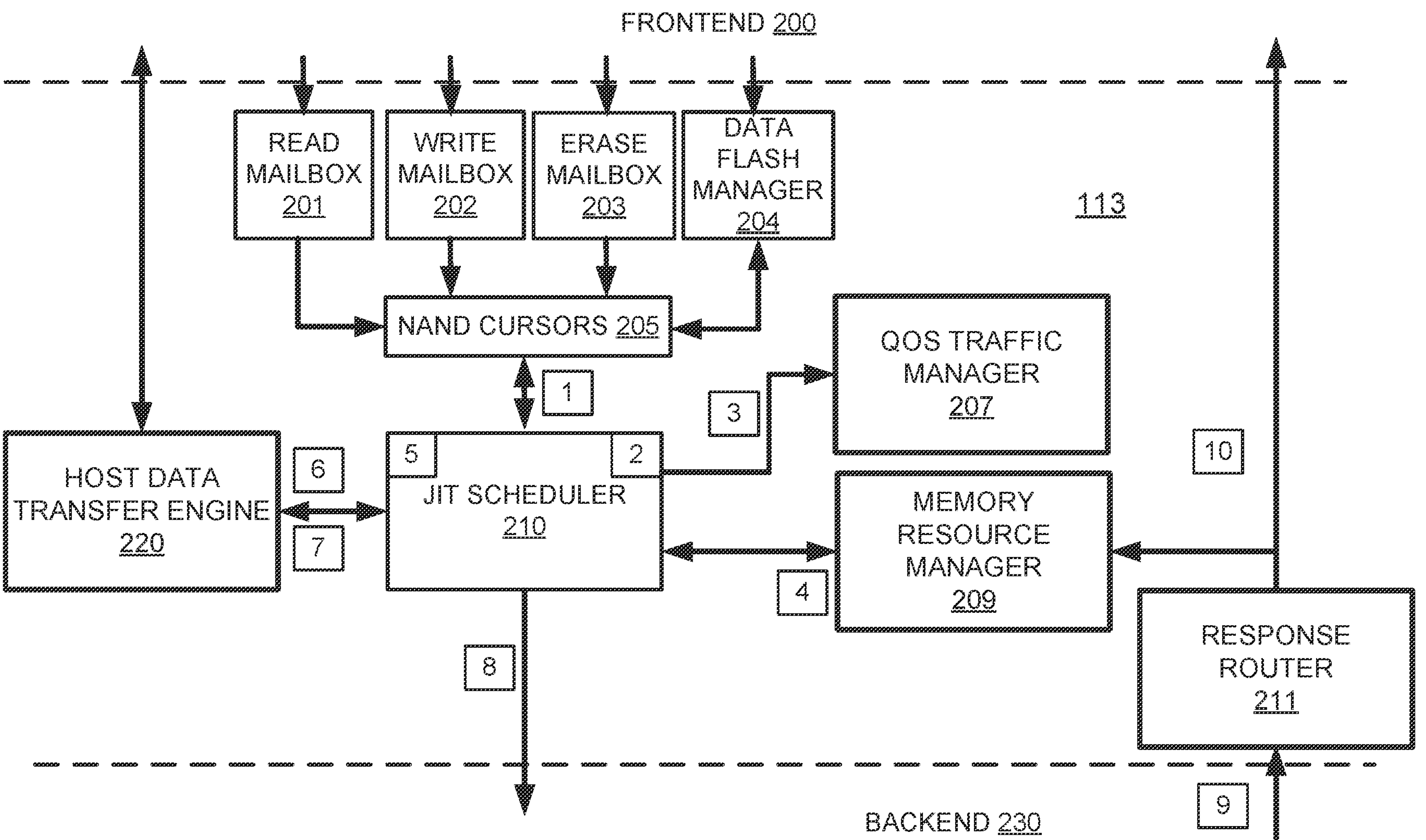
FIG. 2 illustrates a block diagram of a just in time (JIT) scheduling component according to one embodiment.

FIG. 2 illustrates a block diagram of a JIT scheduling component 113 according to one embodiment. JIT scheduling component 113 can include JIT scheduler 210, QoS traffic manager 207, memory resource manager 209, and response router 211. Each of modules 207-211 can be implemented by software, hardware, or their combination.

JIT scheduler 210 can retrieve and schedule the incoming requests by traffic class within a current scheduling time frame, which can be one or a multiple of clock cycles of the memory sub-system. In one embodiment, the incoming requests are stored in scheduling pool(s). In other implementations, the incoming requests can be stored in first-in-first-out (FIFO) queue(s), first-in-last-out (FILO), or a combination thereof. FIFO/FILO describes the order the requests are accessed. For a FIFO queue, when a request is received, the request is added to the tail of the queue. A request to be processed is then taken out from the head of the queue.

In one embodiment, the incoming requests can be stored in pools of linked lists (singly or doubly-linked lists), where each pool has one linked list of incoming requests. In one embodiment, referring to FIG. 3, JIT scheduler 210 stores requests in a two-dimensional array of scheduling pools 300, where each pool 302 in array 300 is intended for a particular traffic class and a particular backend resource. When a request is received from read/write/erase mailboxes 201-203, the JIT Scheduler can attempt to retrieve any available node from free pool 301, fill out the request with the appropriate information (memory operation, traffic class, memory operation type, etc.), and place the node in a pool in array 300 according to the traffic class and the backend resource corresponding to the request. A mailbox is a buffer where frontend 200 puts the requests, and JIT scheduler 210 would eventually retrieve these requests. Here, the node is linked to a linked list in array 300 and the node can store information for a request. A linked list can store one or more nodes, where each node contains a reference to the next node in the list. The JIT scheduler 210 can iterate through each pool in array 300, e.g., pool[1][1] pool[m][n], to determine if a particular pool has any requests, and whether the request can be processed. In one embodiment, JIT scheduler 210 iterates through each pool by round robin. A round robin is an arrangement of selecting requests from all the pools sequentially in a predetermined order. The predetermined order defines the priority for the traffic classes. For example, the traffic class host read can have a higher priority than host write, and host write can have a higher priority than background operations. Thus, the predetermined order can prioritize host read over host writes, and host writes over background operations. In another embodiment, the rotation is weighted round robin. A weighted round robin is similar to round robin, except the requests are selected according to a weight associated to each pool. If a request in a pool can be processed (i.e., if QoS credits and NAND resources are available, as discussed further below), the node for the request is removed from the pool, forwarded to the backend (e.g., memory devices), and the node is placed back into the free pool 301. In summary, array 300 can be used to ensure that, when there are requests of different combinations of traffic classes and backend resources, the request submissions are selected (or selected according to the weights in a weighted round robin) from the different traffic classes/resource combinations.

Figure 4:
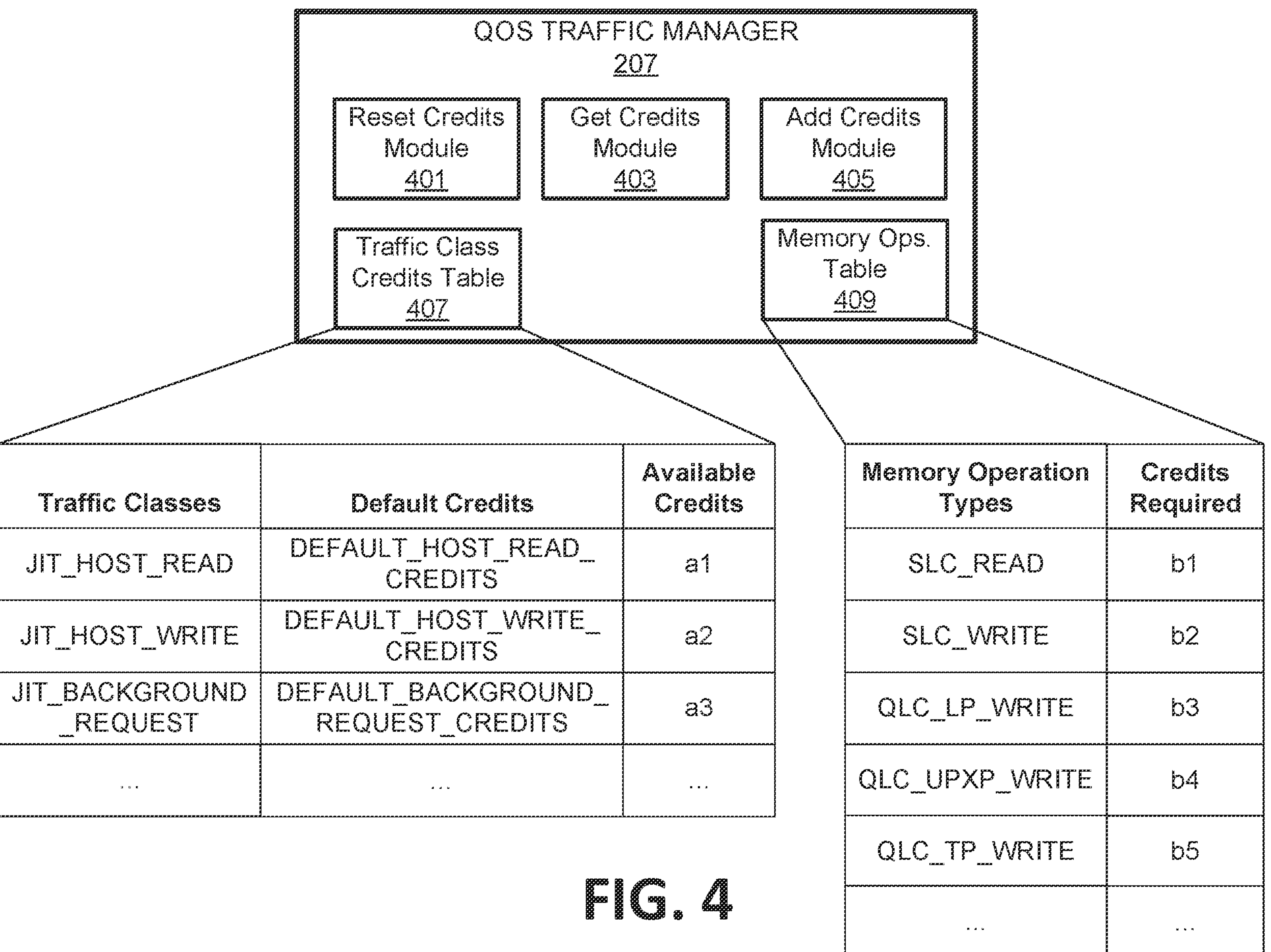
FIG. 4 illustrates a block diagram of a quality of service (QoS) traffic manager according to an embodiment.

QoS traffic manager 207 can implement a quality of service (QoS) policy for the request pools. In one embodiment, the implemented QoS policy can manage the requests within a scheduling time frame according to their traffic class and using a credit-based scheme to avoid starving lower priority request pools. For example, upon initialization, the credit-based scheme can specify a preconfigured number of available QoS credits for each traffic class. JIT scheduler 210 then consumes QoS credits from a particular traffic class before forwarding requests to the backend. A request can only be submitted when there is a requisite number of available QoS credits for submitting the request, and then the number of available QoS credits is decremented to reflect the submission. This way, when there are requests of different traffic classes, the request submissions from the different traffic classes are managed by the number of available QoS credits for the traffic class, within a given scheduling time frame. As illustrated in FIG. 4, in one embodiment, QoS traffic manager 207 can include modules such as reset credits module 401, get credits module 403, add credits module 405, traffic class credits table 407, and memory operation types table 409. Tables 407-409 can be initialized by QoS traffic manager 207 and can be stored in local memory 119. Traffic class credits table 407 can specify various traffic classes, the preconfigured number of credits (default credits), and available credits for a respective traffic class. In one embodiment, the traffic classes can include host read (JIT_HOST_READ), host write (JIT_HOST_WRITE), and background request (JIT_BACKGROUND_REQUEST). The default credits column for the respective traffic class can be DEFAULT_HOST_READ_CREDITS, DEFAULT_HOST_WRITE_CREDITS, and DEFAULT_BACKGROUND_REQUEST_CREDITS, respectively. The default credits is what the available credits (a1, a2, and a3) can be set to at the beginning of each new scheduling time frame. The available credits column can store a count of available credits for a traffic class. Reset credits module 401, get credits module 403, and add credits module 405, each, can modify (reset, subtract, and add, respectively) the credits from the available credits column.

Memory operation types table 409 can specify a number of memory operation types and their corresponding credit requirements. For example, the memory operation types can include different operations (read or write) for different types of memory cells. Some example types are: single-level-cell (SLC) read (SLC_READ), SLC write (SLC_WRITE), QLC LP write (QLC_LP_WRITE), QLC UPXP write (QLC_UPXP_WRITE), QLC TP write (QLC_TP_WRITE). Note that, quad level cell (QLC) can have four pages referred to as lower page (LP), upper page (UP), extra page (XP), and top page (TP). The different memory operation types can represent different operations to access a page of a SLC or a page of a QLC memory cell. Referring to FIG. 4, example of credits required to complete these operations can be preset to: b1, b2, b3, b4, and b4, respectively. The different memory operation types can have different processing requirements: timing requirement, power requirements, thermal loads, or a combination thereof. Although only three traffic classes and five memory operation types are shown, QoS traffic manager 207 can specify any number of traffic classes and memory operation types.

For one example, at the beginning of a scheduling time frame or responsive to a power up event, QoS traffic manager 207 can set the available credits column of table 407 to equal to the default credits column of table 407 (via reset credits module 401). The JIT scheduler 210 can decrement some credits from available credits of a particular traffic class when it submits a memory operation request associated with that traffic class to the backend (via get credits module 403). QoS traffic manager 207 then determines, using the available credits column of table 407, how many credits are available for the traffic class and either grants the request submission if there remains enough available credits to service the request, or denies the request submission if the number of available credits is less than the required credits to service the request. If the memory operation subsequently fails for other reasons (such as, the backend resource is busy, etc.), add credits module 405 can add back the granted credits to the available credits for the traffic class.

Backend resource manager 209 can manage the availability of backend resources for incoming requests. As previously described, the backend resources can be software or hardware parallelizable units that is accessible by the memory controller at any given time. Examples of backend resource include a NAND die, a plane, a block, a page, or a logical command processor (LCP), etc. The backend resource can be specified based on an architecture of the backend memory devices or the memory controller. For example, if the backend memory devices are accessible in parallel channels by the memory controller, the backend resource can be specified as a LCP.

Figure 5:
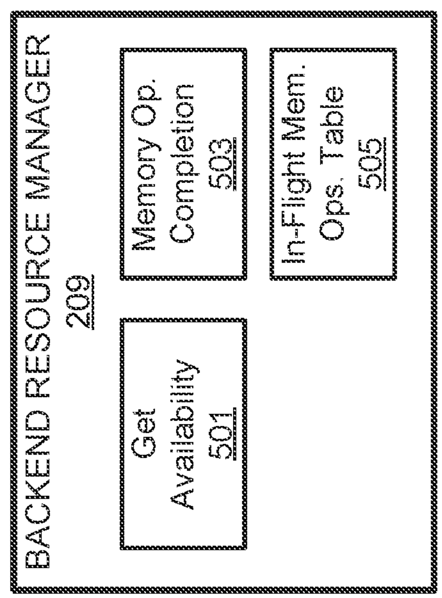
FIG. 5 illustrates a block diagram of a memory resource manager according to an embodiment.

Referring to FIG. 5, in one embodiment, backend resource manager 209 includes get availability module 501, memory operation completion module 503, and in-flight memory operations table 505. These modules can be implemented as software-based or hardware-based modules. Get availability module 501 tracks availability of backend resources and can determine if a particular backend resource is available. Memory operation completion module 503 tracks completion status of memory operations and can determine whether a memory operation that is previously submitted has completed. Backend resource manager 209 can store a list of previously submitted memory operation requests that are yet to be complete at in-flight memory operations table 505. In-flight memory operations table 505 may be stored as part of local memory 119 if FIG. 1.

In one embodiment, JIT scheduler 210 requests availability (via get availability module 501) of a given backend resource and memory operation type. Backend resource manager 209 can compare the requested backend resource with the backend resources of the memory operations in flight to determine the availability of the requested backend resource. Depending on the availability, backend resource manager 209 can return a pass/fail status code. For example, if the requested backend resource is a particular page of a block, backend resource manager 209 can compare it with the pages of the in-flight memory operations to determine if the particular page is currently being accessed.

In another example, if the requested backend resource is a particular LCP, backend resource manager 209 can compare the LCPs used by the in-flight memory operations to determine if the particular LCP is available. In another example, the LCP is available if the number of outstanding memory operations for each LCP falls below a predetermined threshold. Thus, backend resource manager 209 can manage availability of backend resources in a way that would not compromise performance of the memory subsystem.

In another embodiment, backend resource manager 209 implements a predictive model to predict if an LCP is available. The predictive model can base the prediction on one or more parameters (e.g., the submission time and the type) of the last memory operation. For example, if the last memory operation was submitted t nanoseconds ago, and is of the memory operation type that is expected to complete within t nanoseconds, the last memory operation is treated as completed. Thus, a current memory operation request can be submitted before the last memory operation completion is acknowledged by the backend resource manager 209 via response router 211. Thus, this predictive model can be used to keep a pipeline of the backend loaded more efficiently.

Referring to FIG. 2, operations 1-10 are illustrated for an example scheduling process flow according to one embodiment.

Operation 1. JIT Scheduler 210 receives a read/write/erase request from NAND cursors 205. The request can be a host read, a host write, or a background memory operation received from frontend 200. A background memory operation can be a background read, background write, or a background erase operation. The background operation can represent a media management operation initiated by the memory controller to maintain a predefined data state metric of the memory device within a specified range. NAND cursors 205 can receive these requests from read mailbox 201, write mailbox 202, or erase mailbox 203. In another embodiment, JIT Scheduler 210 can receive the memory operation requests directly from mailboxes 201-203. The requested memory operations can utilize logical or physical addresses. For commands utilizing logical addresses, JIT Scheduler 210 can request NAND cursors 205 to translate the logical addresses to corresponding physical addresses using a logical to physical translation table from data flash manager 204. NAND cursors 205 then sends the physical addresses back to JIT scheduler 210. Mailboxes 201-203 can be memory buffers that store the requested command operations.

Figure 3:
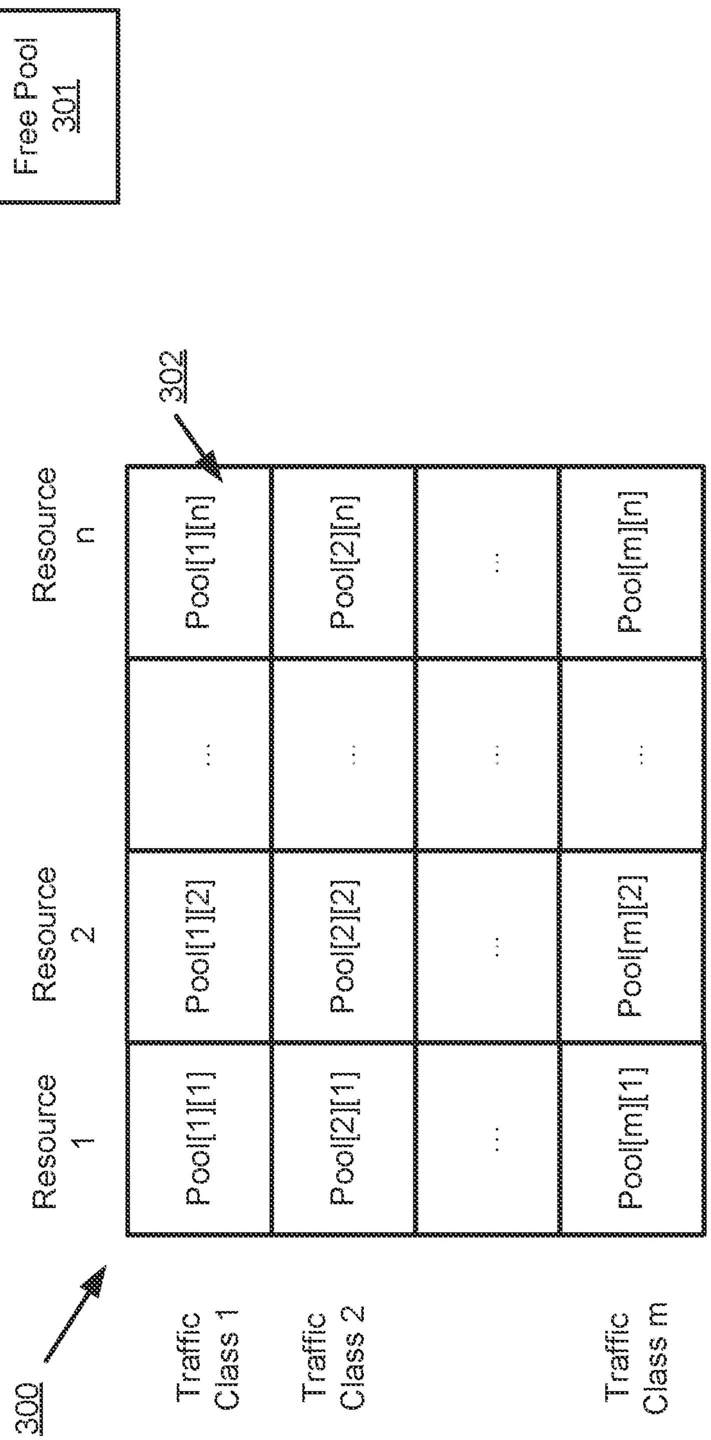
FIG. 3 illustrates an example of a two-dimensional array of scheduling pools according to an embodiment.

Operation 2. JIT scheduler 210 manages the incoming requests from NAND cursors 205. For example, JIT scheduler 210 can store incoming requests in a two-dimensional (m×n) array of scheduling pools, as illustrated in FIG. 3, according to the traffic class and backend resources corresponding to the incoming requests. Each pool corresponds to a particular combination of traffic class and backend resource. JIT scheduler 210 can use a round robin or weighted round robin to select a round of requests from the scheduling pools for submission to backend 230. For example, for one scheduling time frame, JIT scheduler 210 can traverse the m×n array of schedule pools in a predetermined order (e.g., traversing the pool in a specified dimension first).

Operation 3. For an incoming request, JIT scheduler 210 can retrieve the credits from QoS traffic manager 207. For example, from the requested traffic class and the memory operation type, JIT scheduler 210 determines whether there are sufficient credits to service the request. QoS traffic manager 207 returns a success or failure status based on the determination. Upon receiving a failure status, the incoming request is placed back into the scheduling pool, to be submitted in a future scheduling time frame. For a successful status, the JIT scheduler 210 proceeds to check if the backend is available for the request.

Operation 4. JIT scheduler 210 can send a request to backend resource manager 209 to check the backend resource availability for servicing the request. For example, backend resource manager 209 can determine if any of the outstanding requests are using a requested backend resource. Here, backend resource manager 209 can track the outstanding (or in-flight) requests and compare the outstanding requests to the current request. If the comparison results in a match, e.g., the backend resource corresponding to the outstanding request is the backend resource being requested, the requested backend resource can be considered unavailable. In one embodiment, for LCP as the backend resources, backend resource manager 209 can compare FPAs corresponding to the outstanding requests with the FPA corresponding to the current request for overlaps. Backend resource manager 209 can determine that the backend resource is available if there is no overlap. In another embodiment, backend resource manager 209 treats the backend resource as available if the number of outstanding requests for the LCP falls below a certain threshold. In another embodiment, backend resource manager 209 predicts, by analyzing the last request that was submitted, if the backend resource is available. Backend resource manager 209 returns a status code reflecting the availability of the specified resource.

If the specified backend resource is not available, JIT scheduler 210 returns the credit to QoS traffic manager 207 (via add credits module 405) and appends the request back to the scheduling pool to be processed at a future time. Otherwise (i.e., if the specified backend resource is available), backend resource manager 209 stores the request into an in-flight memory operations table (e.g., table 505 of FIG. 5) and marks the request as an in-flight request.

Operation 5. If the request is a host write, JIT scheduler 210 allocates a data buffer for the request and waits for host data transfer engine 220 to provide the data. Other request types proceed to operation 8.

Operation 6. For a host write request, JIT scheduler 210 can request the data from frontend 200 via host data transfer engine 220. The data request can be asynchronous so that JIT scheduler 210 can process the next request simultaneously with processing the current request.

Operation 7. Host data transfer engine 220 can store the requested data to the allocated data buffer within JIT scheduler 210 and send a transfer complete response to JIT scheduler 210.

Operation 8. Once the request is ready for submission, it is submitted to the backend 230.

Operation 9. Response router 211 receives an operation complete response from backend 230.

Operation 10. Response router 211 routes the response to backend resource manager 209 and/or frontend 200 to inform them of the operation completion.

Figure 6:
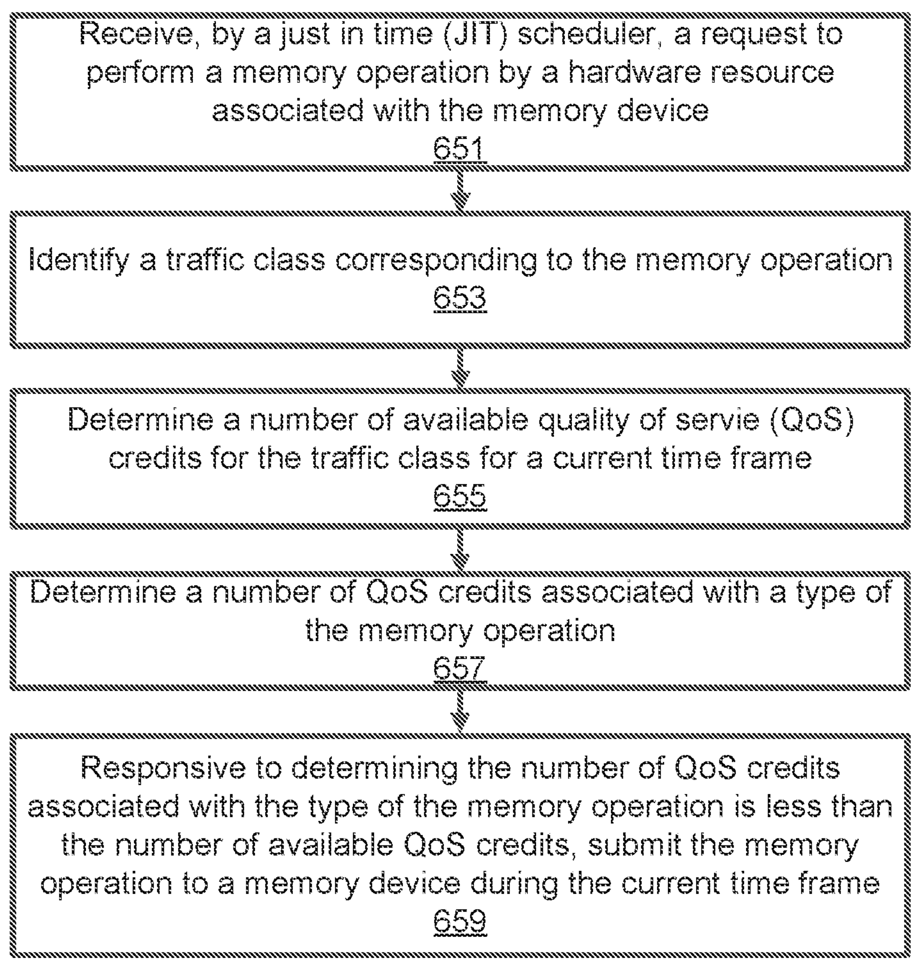
FIG. 6 is a flow diagram of an example method to schedule a memory operation according to an embodiment.

FIG. 6 is a flow diagram of an example method 650 to schedule a memory operation request in accordance with some embodiments of the present disclosure. Method 650 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 650 is performed by JIT scheduling component 113 of FIG. 1 or JIT scheduler 210 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 651, processing logic receives a request to perform a memory operation using a hardware resource associated with the memory device. In one embodiment, processing logic queues the request in an inbound queue. The inbound queue can be represented by an (m×n) array of scheduling pools. Each scheduling pool in the (m×n) array of scheduling pools corresponds to a particular hardware resource and a particular traffic class. The scheduling pool can be implemented as a linked list (singly or doubly linked list), where information for the request can be stored in a node in the linked list. During a scheduling time frame, processing logic can select one or more rounds of requests from the scheduling pools by round robin or weighted round robin for processing according to a predetermined order.

At operation 653, processing logic identifies a traffic class corresponding to the memory operation. For example, the traffic classes can be one of: host read, host write, and background operation.

At operation 655, processing logic determines a number of available quality of service (QoS) credits for the traffic class during a current scheduling time frame. At a start of a scheduling time frame, or when the memory subsystem powers up, a data buffer (or table) storing available credits for a traffic class is assigned credits equal to their default credits. Each traffic class has a predetermined number of default credits. The available QoS credits decrement when processing logic gets a number of QoS credits for a memory operation from the available QoS credits.

At operation 657, processing logic determines a number of QoS credits associated with a type of the memory operation. Each memory operation corresponds to a memory operation type. Each memory operation type is associated with a predetermined number of credits to complete the type of memory operation. Some example types may be: SLC read, SLC write, QLC LP write, QLC UPXP write, and QLC TP write. Here, quad level cell (QLC) can have four pages referred to as lower page (LP) and upper pages (UP, XP, and TP). The different memory operation types can have different processing requirements: timing latency, power requirements, thermal loads, or a combination thereof. The QoS credits can represent these processing requirements. Thus, different memory operation types can be associated with different QoS credits.

At operation 659, responsive to determining the number of QoS credits associated with the type of the memory operation is less than the number of available QoS credits, processing logic submits the memory operation to be processed at a memory device during the current scheduling time frame and decrements the available QoS credits by the number of QoS credits associated with the memory operation. If the number of QoS credits associated with the memory operation is greater than the available QoS credits, processing logic places the request back into a scheduling pool (e.g., queues) for the request to be processed at a later scheduling time frame. That is, processing logic can manage the number of memory operations of a traffic class submitted within the scheduling time frame. The available QoS credits place a limitation on how many memory operations of the traffic class can be submitted within the scheduling time frame to avoid starvation of lower priority requests.

Processing logic can further determine an availability of the hardware resource prior to submitting the request to the memory device. Processing logic can determine hardware resource availability using information of in-flight (outstanding) memory operations that are previously submitted but have yet to complete. In one embodiment, based on a statistical model, using the information for in-flight requests, process logic can determine a count of outstanding requests of the hardware resource. If the count is below a predetermined threshold, processing logic determines that the hardware resource is available and processing logic submits the request to the memory device. Note that the hardware resource can be a NAND die, a NAND plane, a NAND block, a NAND page, a LCP, etc.

Processing logic can also determine an availability of the hardware resource using a predictive model. The predictive model can predict, based on information of a last submitted request associated with the hardware resource, when the last submitted request will complete. The information of the last submitted request may include: a memory operation type of the last submission and a submission timestamp of the last submission. Based on these information, processing logic can predict when the memory operation completes.

Figure 7:
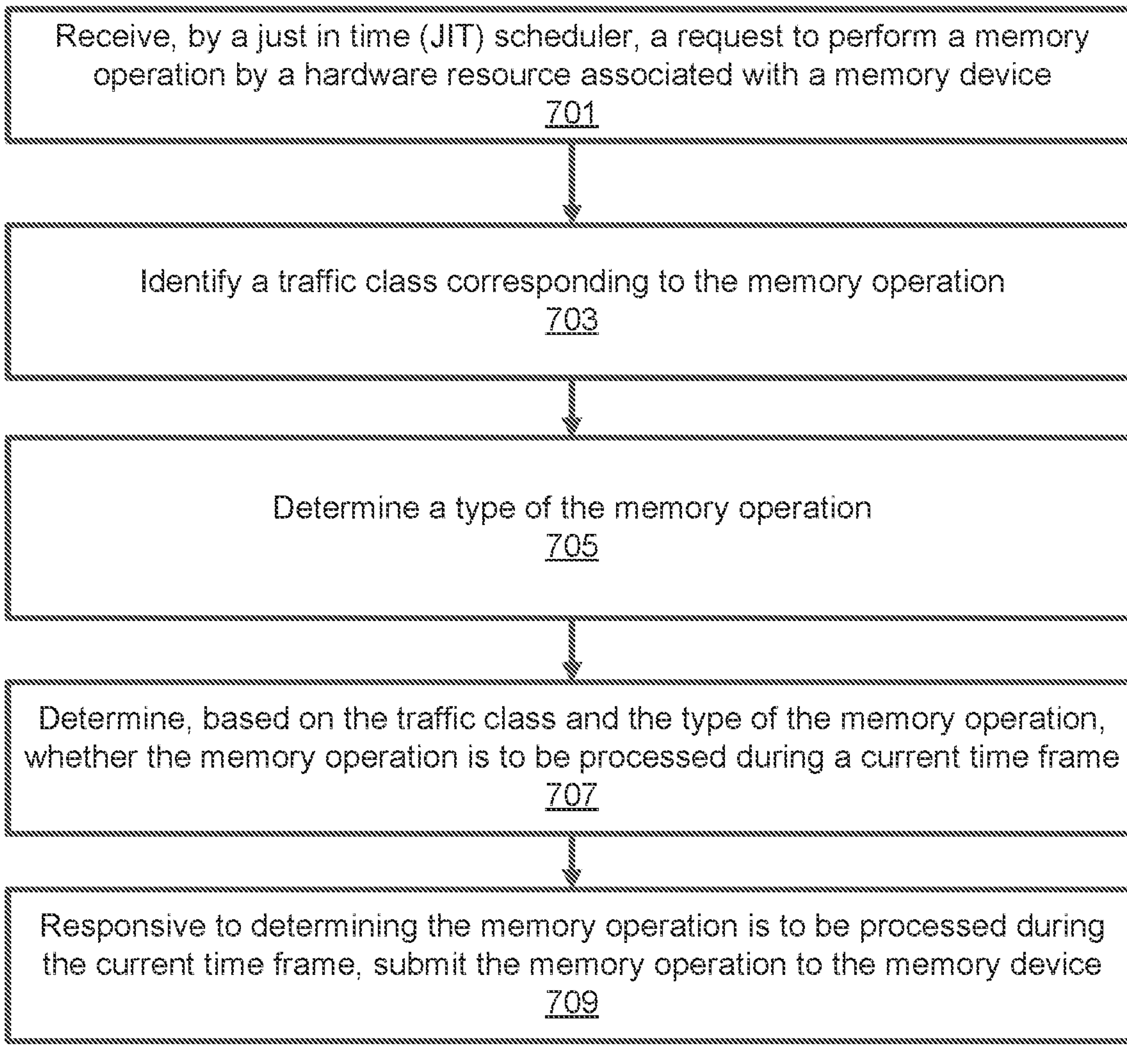
FIG. 7 is a flow diagram of an example method to schedule a memory operation according to an embodiment.

FIG. 7 is a flow diagram of an example method 700 to schedule a memory operation request in accordance with some embodiments of the present disclosure. Method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the JIT scheduling component 113 of FIG. 1 or JIT scheduler 210 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 701, processing logic receives a request to perform a memory operation using a hardware resource associated with a memory device. At operation 703, processing logic identifies a traffic class corresponding to the memory operation. Some example traffic classes can be: host read, host write, and background operation. At operation 705, processing logic determines a type of the memory operation corresponding to the memory operation. Some example types can be: SLC read, SLC write, QLC LP write, QLC UPXP write, and QLC TP write.

At operation 707, processing logic determines, based on the traffic class and the type of the memory operation, whether the memory operation is to be processed during a current scheduling time frame. For example, processing logic determines available QoS credits for the traffic class and required QoS credits to complete a request for the memory operation type. If there are more available QoS credits than the required QoS credits, the memory operation is to be processed during the current scheduling time frame and processing logic decrements the available QoS credits. Otherwise, the memory operation is queued to be processed at a future scheduling time frame. At operation 709, responsive to determining the memory operation is to be processed during the current scheduling time frame, processing logic submits the memory operation to be processed at the memory device.

The scheduling for the memory operations can be simulated before deployment. For example, a latency simulator can simulate the system level performance for various workloads submitted to the JIT scheduler, by simulating the expected latencies of memory operations for each traffic class and memory operation type. Information for the expected latencies of memory operations according to their traffic class and memory operation type can be used to simulate the performance of the JIT scheduler. This simulator can estimate the system level performance impacts that may arise from using different NAND types and background operation algorithms. Thus, the amount of available QoS credits for each traffic class and the QoS credits required to complete certain memory operations can be further adjusted by an operator for desired scheduling latencies for various workloads.

Figure 8:
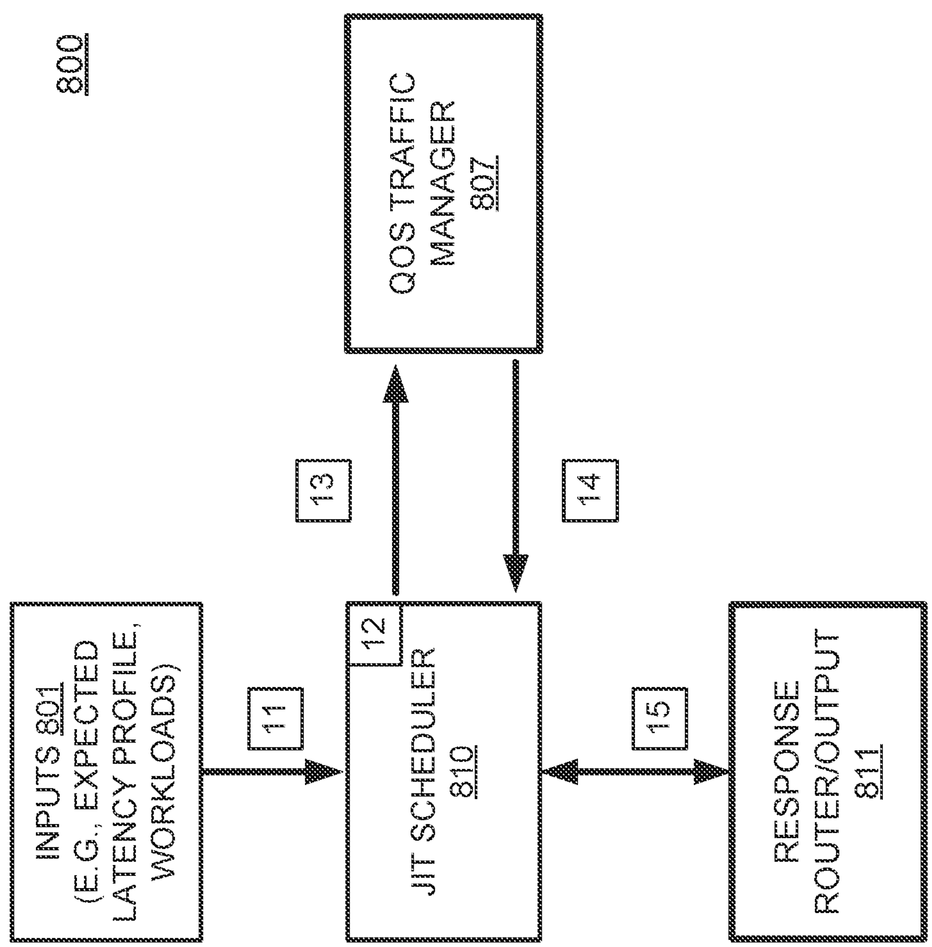
FIG. 8 illustrates a block diagram of a latency simulator according to one embodiment.

FIG. 8 illustrates a block diagram of a latency simulator according to one embodiment. Latency simulator 800 can simulate a latency model for a JIT scheduler. Simulator 800 can include input module 801, JIT scheduler 810, QoS traffic manager 807, and response router/output 811. Each of modules 801-811 can be a hardware-based or a software-based module of a latency simulator.

Inputs module 801 can receive, e.g., via an input/output (I/O) interface or a graphical user interface (GUI), an expected latency profile. The expected latency profile, as illustrated in profile 809 of FIG. 9, represents the expected time periods to process memory operations of various traffic classes according to their memory operation types. The expected latency profile can reflect the characteristics of a particular NAND device and how much time a memory operation requires to perform the memory operation of that type on the NAND device. The expected latency profile may be in the form of a binary metadata file, a text file, or a spreadsheet.

Inputs module 801 can receive a workload listing, the workload listing can specify a list of memory operations of various traffic classes that can be forwarded to JIT scheduler 810 at various times to test the performance of JIT scheduler 810. An example workload listing can include 10 SLC read memory operations to be submitted at scheduling time frame 1; 20 SLC write memory operations to be submitted at scheduling time frame 2, and so forth. The workload profile can specify repetitions of certain memory operations, or can have unique sets of memory operations for each scheduling time frame. The workload listing may be in the form of a binary metadata file, a text file, or a spreadsheet generated by the operator.

In one embodiment, inputs module 801 includes read/write/erase buffers (not shown) for JIT scheduler 810, where the memory operations of various types (read, write, erase) are stored in the buffers. JIT scheduler 810 can then retrieve the memory operations from the read/write/erase buffers for processing. The read/write/erase buffers implements the functionalities of the read/write/erase mailboxes of FIG. 2.

Figure 10:
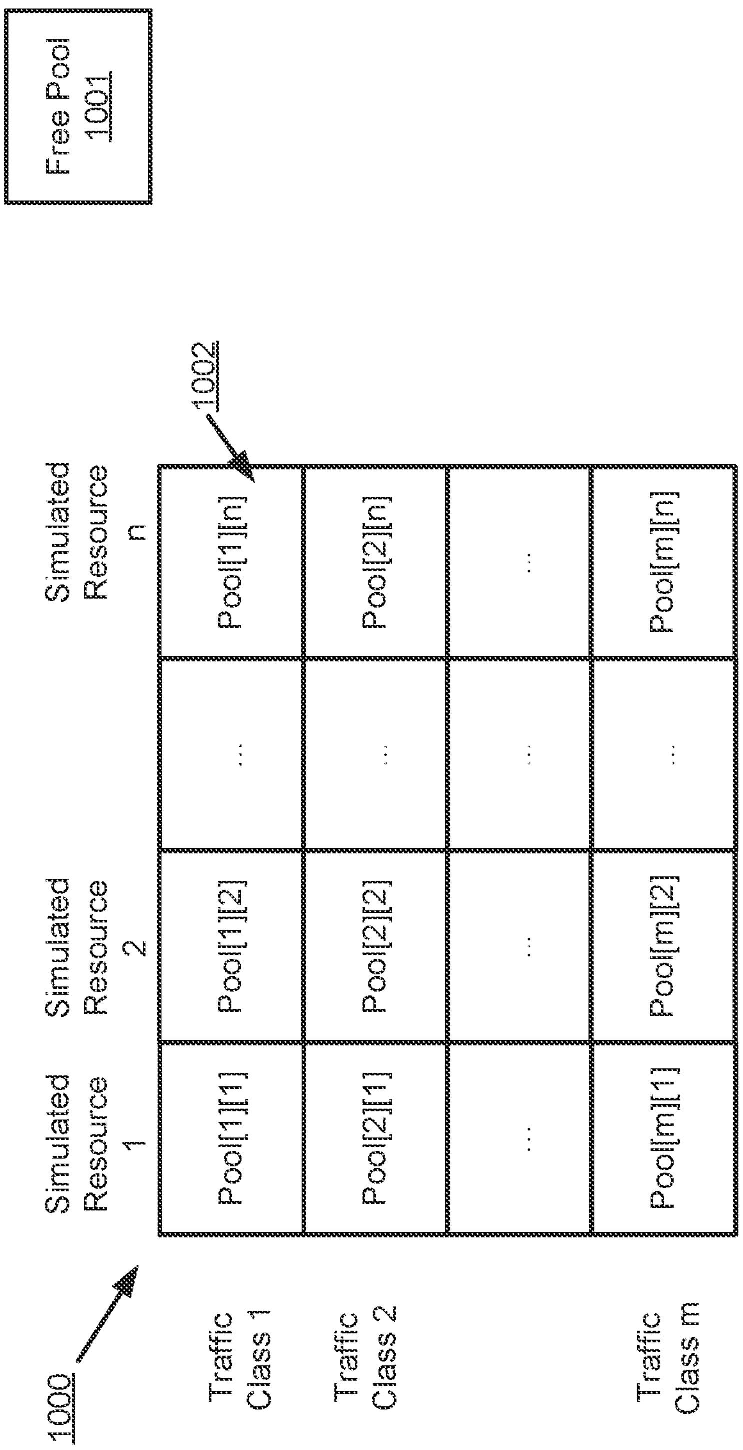
FIG. 10 illustrates an example of a two-dimensional array of scheduling pools according to an embodiment.

JIT scheduler 810 can schedule the memory operations at various scheduling time frames specified by the workload listing. In some embodiments, JIT scheduler 810 can, similarly to operations of JIT scheduler 210 of FIG. 2, schedule the memory operations using first-in-first-out (FIFO) queue(s), first-in-last-out (FILO), pool(s), or a combination thereof. In one embodiment, memory operations may be scheduled in scheduling pools 1000 as illustrated in FIG. 10. Scheduling pools 1000 can include one or more linked lists (singly or doubly-linked lists). In one embodiment, similar to scheduling pools 300 of FIG. 3, pools 1000 is a two-dimensional array of scheduling pools, where each pool 1002 in pools 1000 is intended for a particular traffic class and a particular simulated backend resource, e.g., traffic class 1 . . . m and simulated backend resources 1 . . . n. In one embodiment, the simulated backend resources 1 . . . n are simulated to be available all the time.

In one example, when a memory operation is received from inputs module 801, the JIT scheduler 810 can retrieve a node from free pool 1003, add the appropriate information from the memory operation into the node, and place the node into one of pools 1000 according to the traffic class and the simulated backend resource corresponding to the memory operation. The JIT scheduler 810 can iterate through each pool in pools 1000, e.g., pool[1][1] pool[m][n], to determine if a particular pool has any memory operation, and determine whether the memory operation can be processed. In one embodiment, JIT scheduler 810 iterates through each pool by round robin in a predetermined order. In another embodiment, JIT scheduler 810 iterates through each pool by weighted round robin in the predetermined order. The predetermined order can define the priority for the various traffic classes. For example, the traffic class of host read can have a higher priority than host write, etc. If a memory operations in a pool can be processed (i.e., if QoS credits are available), the node for the memory operations is removed from the pool, forwarded to response router 811, and the node is placed back into the free pool 1001. Thus, pools 1000 can be used to ensure that the memory operations are selected (or selected according to the weights based on a weighted round robin algorithm) among the different traffic classes according to their portion of available QoS credits. In some embodiments, the simulated backend resources are assumed to be available.

Referring to FIG. 8, QoS traffic manager 807 can implement a quality of service (QoS) policy for the scheduling pools, similar to QoS traffic manager 207 of FIG. 2. In one embodiment, the implemented QoS policy can manage the memory operations within a scheduling time frame according to their traffic class, using a QoS credit-based scheme to avoid starving lower priority request pools. For example, upon initialization, the credit-based scheme can specify preconfigured number of available QoS credits for each traffic class. JIT scheduler 810 then consumes QoS credits from a particular traffic class before forwarding the memory operations to response router 811. A memory operation can only be submitted when there is a requisite number of available QoS credits for submitting the memory operation, and then the number of available credits is decremented to reflect the submission. This way, when there are memory operations of different traffic classes, the memory operation submissions from the different traffic classes are managed by the number of available credits for the traffic class, within a given scheduling time frame. As illustrated in FIG. 11, in one embodiment, QoS traffic manager 807 can include modules such as reset credits module 401, get credits module 403, memory operation types table 409, and traffic class credits table 1101. Tables 409 and 1101 can be initialized by QoS traffic manager 807 and can be stored in memory. Traffic class credits table 1101 can specify various traffic classes, the preconfigured number of credits (default credits), and available credits for a respective traffic class. In one embodiment, the traffic classes can include host read (JIT_HOST_READ), host write (JIT_HOST_WRITE), and background memory operations (JIT_BACKGROUND_READ, JIT_BACKGROUND_WRITE, AND JIT_BACKGROUND_ERASE). The default credits column for the respective traffic class can be DEFAULT_HOST_READ_CREDITS, DEFAULT_HOST_WRITE_CREDITS, DEFAULT_BACKGROUND_READ_CREDITS, DEFAULT_BACKGROUND_WRITE_CREDITS, and DEFAULT_BACKGROUND_ERASE_CREDITS respectively. The default credits is what the available QoS credits (a1, a2, a3, . . . ) can be set to at the beginning of each new scheduling time frame. The available credits column can store a count of available QoS credits for a traffic class. Reset credits module 401 and get credits module 403, each, can modify (reset and subtract, respectively) the credits from the available credits column.

Memory operation types table 409 can specify a number of memory operation types and their corresponding QoS credit requirements. For example, the memory operation types can include different operations (read, write, or erase) for different types of memory cells. Some example types are: single-level-cell (SLC) read (SLC_READ), SLC write (SLC_WRITE), QLC LP write (QLC_LP_WRITE), QLC UPXP write (QLC_UPXP_WRITE), QLC TP write (QLC_TP_WRITE). Note that, quad level cell (QLC) can have four pages referred to as lower page (LP), upper page (UP), extra page (XP), and top page (TP). The different memory operation types can represent different operations to access a page of a SLC or a page of a QLC memory cell. Example of credits required to complete these operations can be preset to the numeric values: b1, b2, b3, b4, and b4, respectively. The different memory operation types can have different processing requirements: timing requirement, power requirements, thermal loads, or a combination thereof. Although only three traffic classes and five memory operation types are shown, QoS traffic manager 807 can specify any number of traffic classes and memory operation types.

For one example, at the beginning of a scheduling time frame, QoS traffic manager 807 can set the available credits column of table 1101 to equal to the default credits column of table 1101 (via reset credits module 401). The JIT scheduler 810 can decrement some credits from available credits of a particular traffic class when it submits a memory operation associated with that traffic class to the response router 811 (via get credits module 403). QoS traffic manager 807 then determines, using the available credits column of table 1101, how many credits are available for the traffic class and either grants the memory operation submission if there remains enough available credits to service the memory operation, or denies the memory operation submission if the number of available credits is less than the required credits to service the memory operation.

Response router/output 811 can simulate a receiver for memory operation submissions submitted from JIT scheduler 810. Response router/output 811 can retrieve, based on the traffic class and the memory operation type of the memory operation, an expected latency for the memory operation. Response router/output 811 can indicate the memory operation as serviced after a time equal to the expected latency has elapsed since submission by returning a memory operation completion notification to JIT schedule 810. Response router/output 811 can output a file that specifies some statistics for the performance of the JIT scheduler. The output can include a worst case latency for a scheduling time frame, how many scheduling time frame is used for the workload, etc. The output file can also include a plot that can be used to analyze potential bottlenecks, die contentions in the scheduling time frames.

Referring to FIG. 8, operations 11-15 are illustrated for an example simulation according to one embodiment.

Operation 11. JIT Scheduler 810 retrieves a read/write/erase memory operation at various times that are simulated from inputs module 801. The memory operation can be a host read, a host write, or background memory operations traffic classes. A background memory operation can be a background read, background write, or a background erase operation. The memory operation can include associated traffic class data and/or simulated backend resource data. The memory operation can be part of a profile of a workload (e.g., workload profile) provided from an operator to inputs module 801, where the workload profile can include various read/write/erase memory operations at various scheduling time frames to simulate a workload handled by a JIT scheduler.

Operation 12. JIT scheduler 810 manages the incoming memory operations from inputs module 801. For example, JIT scheduler 810 can store incoming memory operations in two-dimensional (m×n) scheduling pools according to the traffic class and the simulated backend resources. JIT scheduler 210 can use a round robin or weighted round robin to select the memory operations from the scheduling pools. For example, during a given scheduling time frame, JIT scheduler 810 can traverse the m×n schedule pools one or more times to retrieve memory operations from these pools.

Operation 13. To process a memory operation specified by an incoming request, JIT scheduler 810 can retrieve the available QoS credits from QoS traffic manager 807. For example, from the requested traffic class and the required QoS credits to complete the memory operation type. JIT scheduler 210 can determine whether there are sufficient credits to service the request, e.g., there is sufficient credit if the available QoS credit is greater than the required QoS credits.

Operation 14. QoS traffic manager 807 returns a success or failure status based on the determination. Upon receiving a failure status, the simulated request is placed back in the scheduling pools, to be submitted in a future scheduling time frame. For a successful status, the JIT scheduler 810 proceeds to operation 15.

Operation 15. JIT scheduler 810 can submit the memory operation to response router 811. Response router 811 can return a simulated memory operation complete status after an expected latency time for the memory operation has elapsed.

Through simulating the timing for workloads of different memory operations, output 811 can generate an output indicating latency statistics of the performance for the workload. The output can include a worst case latency period for a scheduling time frame, and how many scheduling time frames are required to complete particular workloads, etc. For example, output 811 can calculate a worst case latency for a scheduling time frame by calculating latencies for each traffic class. Output 811 can calculate traffic class latencies for a traffic class by adding the memory operation latencies together, for memory operations according to the traffic class. Output 811 can then apply a max function to different traffic class latencies find which traffic class has the worst latency within the scheduling time frame. In another embodiment, output 811 calculates the worst case latency for a scheduling time frame by: determining an average latency for memory operations in a traffic class, and calculating the worst case latency by multiplying the average latency with the number of memory operations of the traffic class within the scheduling time frame.

In one embodiment, the number of frames used for the workload can be calculated from the number of scheduling time frames required to complete the memory operations in the workload profile. In another embodiment, the number of scheduling time frames used for the workload is estimated from the number of memory operations in the workload.

Simulating different workloads allows latencies of the JIT scheduler to be analyzed, with varying available QoS credits and the required QoS credits for various types of memory operations. The analysis can provide the worst case latencies for various workloads.

Figure 12:
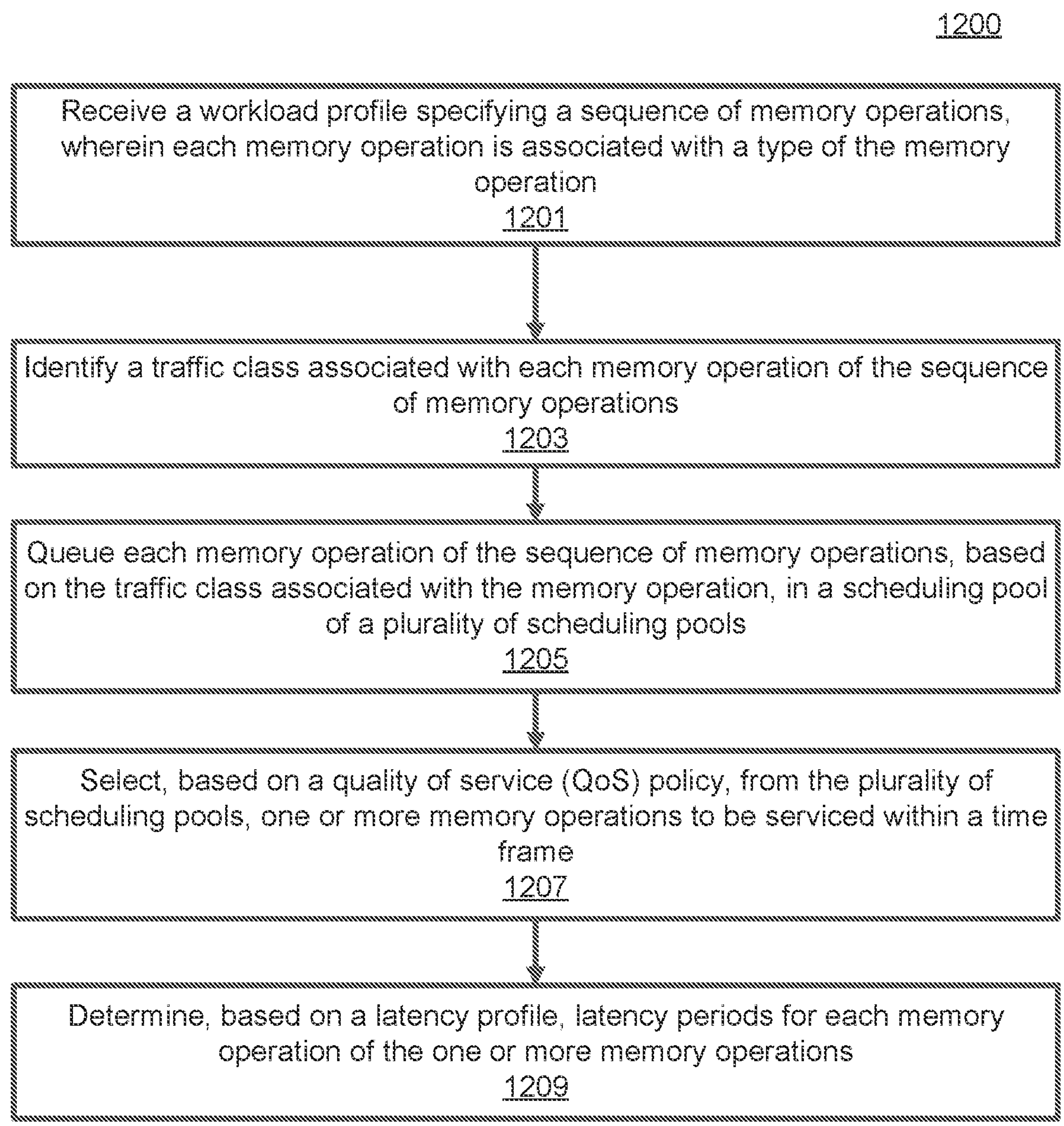
FIG. 12 is a flow diagram of an example method to schedule a memory operation according to an embodiment.

FIG. 12 is a flow diagram of an example method to schedule a memory operation according to an embodiment. Method 1200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 is performed by simulator 800 of FIG. 8. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1201, processing logic receives a workload profile specifying a sequence of memory operations, wherein each memory operation is associated with a type of the memory operation. An example memory operation can be a SLC read, address P1. The memory operation is associated with a traffic class (such as host read), and belongs to a memory operation type (such as SLC read).

At operation 1203, processing logic identifies a traffic class associated with each memory operation of the sequence of memory operations. The traffic classes can include at least one of: host read, host write, background read, and background write, and background erase.

At operation 1205, processing logic queues each memory operation of the sequence of memory operations, based on the traffic class associated with the memory operation, in a scheduling pool of a plurality of scheduling pools. The scheduling pools can be a two-dimensional array of pools, where each pool includes a linked list, and each link in the linked list represents a memory operation request.

At operation 1207, processing logic selects, based on a quality of service (QoS) policy, from the plurality of scheduling pools, one or more memory operations to be serviced within a scheduling time frame. The selecting can further include determining a number of available quality of service (QoS) credits for the traffic class for the scheduling time frame; determining, based on a memory operation type for the memory operation, a number of QoS credits associated with the memory operation; and responsive to determining the number of QoS credits associated with the memory operation is less than the number of available QoS credits for the traffic class, subtracting the number of QoS credits from the available QoS credits and indicating that the memory operation is serviced. The memory operation types can include at least one of: single level cell (SLC) read, SLC write, quad level cell (QLC) lower page (LP) write, QLC upper page (UP) write, QLC extra page (XP) write, and QLC top page (TP) write At operation 1209, process logic determines, based on a latency profile, latency periods for each memory operation of the one or more memory operations. In one embodiment, processing logic further determines, based on the latency profile, memory operation latency periods for each of the one or more memory operations. Processing logic determines a traffic class latency period by summing memory operation latency periods corresponding to memory operations of the traffic class. Processing logic determines a latency period for the scheduling time frame by selecting a largest traffic class latency period among traffic class latency periods of a plurality of traffic classes. The latency profile can include a plurality of latency periods, wherein each latency period of the plurality of latency periods corresponds to a traffic class and a memory operation type.

In one embodiment, processing logic further determines a number of scheduling time frames required to service the sequence of memory operations. Processing logic determines a total latency period for the number of scheduling time frames. For example, the total latency period can equal to the latency period for a scheduling time frame multiplied by the number of scheduling time frames.

FIG. 13 is a flow diagram of an example method to schedule a memory operation according to an embodiment. Method 1300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1300 is performed by simulator 800 of FIG. 8. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1301, processing logic receives a memory operation to be simulated. An example memory operation can be a SLC read, address P1. The memory operation is associated with a traffic class (such as host read), and belongs to a memory operation type (such as SLC read).

At operation 1303, processing logic determines a traffic class corresponding to the memory operation. The traffic classes include at least one of: host read, host write, background read, and background write, and background erase.

At operation 1305, processing logic determines, based on a memory operation type of the memory operation, a number of quality of service (QoS) credits associated with the memory operation. The memory operation types include at least one of: single level cell (SLC) read, SLC write, quad level cell (QLC) lower page (LP) write, QLC upper page (UP) write, QLC extra page (XP) write, and QLC top page (TP) write.

At operation 1307, processing logic determines a number of available QoS credits for the traffic class for a scheduling time frame.

At operation 1309, responsive to determining that the number of QoS credits associated with the memory operation is less than the number of available QoS credits of the traffic class, processing logic subtracts the number of QoS credits from the available QoS credits to indicate that the number of QoS credits is no longer available for the traffic class. At operation 1311, processing logic indicates that the memory operation is serviced.

In one embodiment, processing logic determines, based on a latency profile, a latency period for the memory operation and marking the memory operation as serviced after the latency period for the memory operation has elapsed. In another embodiment, processing logic determines, based on the latency profile, a memory operation latency period for each of the one or more memory operations. Processing logic determines a traffic class latency period by summing memory operation latencies corresponding to memory operations of the traffic class. Processing logic determines a latency period for the scheduling time frame by selecting a largest traffic class latency period for a plurality of traffic classes. The latency profile includes a number of latency periods, where each latency period of the plurality of latency periods corresponds to a traffic class and a memory operation type In one embodiment, processing logic queues the memory operation in one of a plurality of scheduling pools based on the traffic class of the memory operation, and processing logic selects the memory operation from the plurality of scheduling pools by round robin or weighted round robin for the scheduling time frame. In one embodiment, processing logic determines a number of scheduling time frames required to service the plurality of memory operations. Processing logic determines, based on the latency profile, a total latency period for the number of scheduling time frames.

Figure 14:
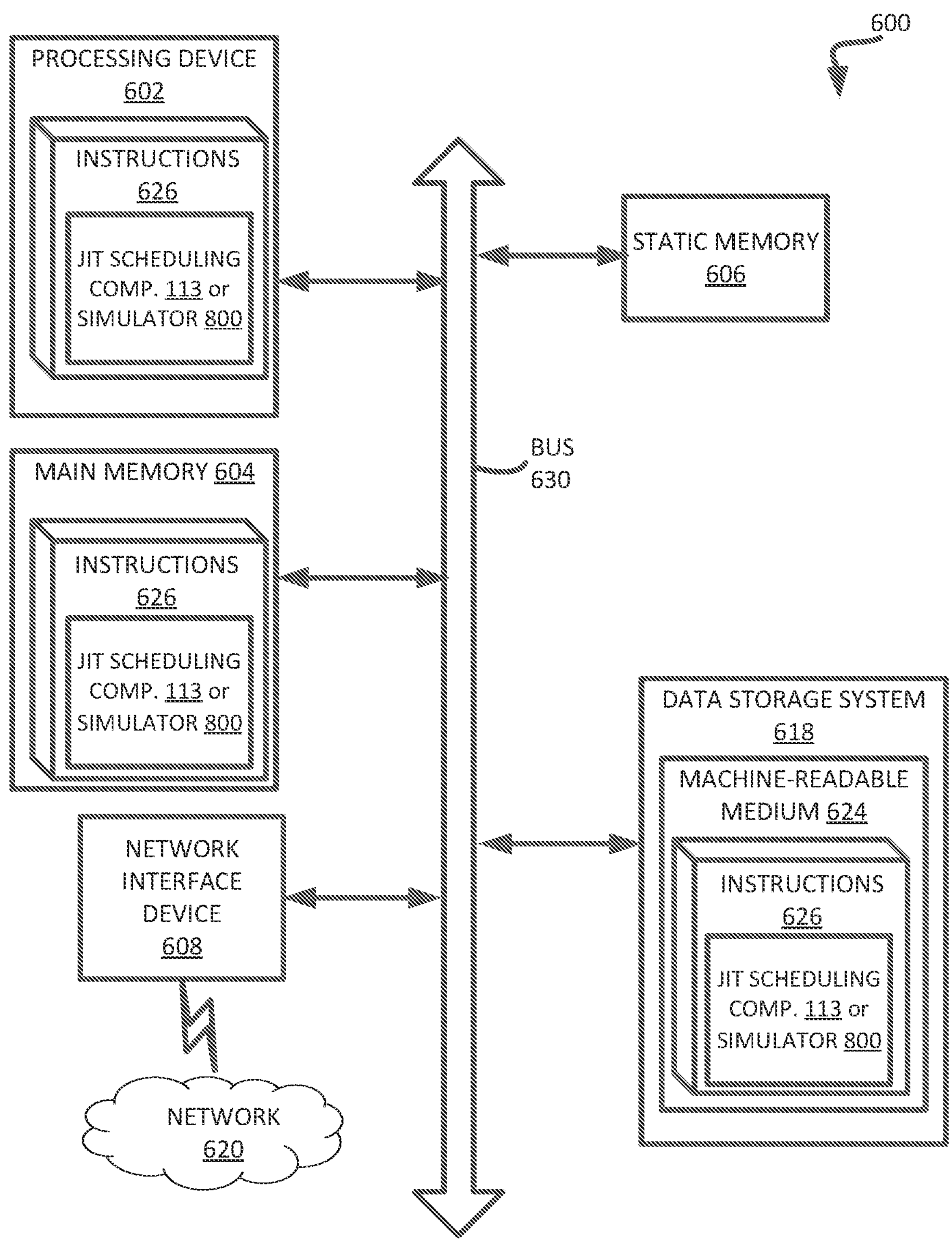
FIG. 14 is a block diagram of an example computer system in which embodiments of the present disclosure can operate.

FIG. 14 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the JIT scheduling component 113 of FIG. 1 or simulator 800 of FIG. 8). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a block selection component (e.g., JIT scheduling component 113 of FIG. 1 or simulator 800 of FIG. 8). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

receiving, by a just-in-time (JIT) scheduler, a request to perform a memory operation using a hardware resource associated with the memory device;

identifying a traffic class corresponding to the memory operation;

determining a number of available quality of service (QoS) credits for the traffic class during a current scheduling time frame;

determining a number of QoS credits associated with a type of the memory operation;

determining that the number of QoS credits associated with the type of the memory operation is less than the number of available QoS credits;

predicting, based on a type of a previous memory operation responsive to a previous request and a time when the previous memory operation has been submitted, that the hardware resource is available; and submitting the memory operation to the memory device.

2. The system of claim 1, wherein receiving the request further comprises:

queueing the request in a scheduling pool of a plurality of scheduling pools, wherein the scheduling pool is associated with the traffic class and the hardware resource; and dequeuing the request from the scheduling pool of the plurality of scheduling pools using a round robin algorithm.

3. The system of claim 1, wherein submitting the memory operation is performed responsive to determining that a count of outstanding requests for the hardware resource is below a predetermined threshold.

4. The system of claim 1, wherein the operations further comprise:

responsive to determining that the number of QoS credits associated with the memory operation exceeds the available QoS credits, queuing the request to be processed at a subsequent scheduling time frame.

5. The system of claim 1, wherein the operations further comprise:

resetting the number of available QoS credits for the traffic class at a subsequent scheduling time frame.

6. The system of claim 1, wherein the traffic class is one of: host read, host write, and background operation.

7. A non-transitory machine-readable storage medium including instructions that, when accessed by a processing device, cause the processing device to execution one or more operations, comprising:

receiving, by a just-in-time (JIT) scheduler, a request to perform a memory operation using a hardware resource of a memory device associated with a memory device;

identifying a traffic class corresponding to the memory operation;

determining a number of available quality of service (QoS) credits for the traffic class during a current scheduling time frame;

determining a number of QoS credits associated with a type of the memory operation;

determining that the number of QoS credits associated with the type of the memory operation is less than the number of available QoS credits;

predicting, based on a type of a previous memory operation responsive to a previous request and a time when the previous memory operation has been submitted, that the hardware resource is available; and submitting the memory operation to the memory device.

8. The non-transitory machine-readable storage medium of claim 7, wherein receiving the request further comprises:

queueing the request in a scheduling pool of a plurality of scheduling pools, wherein the scheduling pool is associated with the traffic class and the hardware resource; and dequeuing the request from the scheduling pool of the plurality of scheduling pools using a round robin algorithm.

9. The non-transitory machine-readable storage medium of claim 7, wherein submitting the memory operation is performed responsive to determining that a count of outstanding requests for the hardware resource is below a predetermined threshold.

10. The non-transitory machine-readable storage medium of claim 7, wherein the operations further comprise: responsive to determining that the number of QoS credits associated with the memory operation exceeds the available QoS credits, queuing the request to be processed at a subsequent scheduling time frame.

11. The non-transitory machine-readable storage medium of claim 7, wherein the operations further comprise: resetting the number of available QoS credits for the traffic class at a subsequent scheduling time frame.

12. The non-transitory machine-readable storage medium of claim 7, wherein the traffic class is one of: host read, host write, and background operation.

13. A method comprising:

receiving, by a just-in-time (JIT) scheduler, a request to perform a memory operation using a hardware resource associated with a memory device;

identifying a traffic class corresponding to the memory operation;

determining a number of available quality of service (QoS) credits for the traffic class during a current scheduling time frame;

determining a number of QoS credits associated with a type of the memory operation;

determining that the number of QoS credits associated with the type of the memory operation is less than the number of available QoS credits;

predicting, based on a type of a previous memory operation responsive to a previous request and a time when the previous memory operation has been submitted, that the hardware resource is available; and submitting the memory operation to the memory device.

14. The method of claim 13, wherein receiving the request further comprises:

queueing the request in a scheduling pool of a plurality of scheduling pools, wherein the scheduling pool is associated with the traffic class and the hardware resource; and dequeuing the request from the scheduling pool of the plurality of scheduling pools using a round robin algorithm.

15. The method of claim 13, wherein submitting the memory operation is performed responsive to determining that a count of outstanding requests for the hardware resource is below a predetermined threshold.

16. The method of claim 13, wherein the operations further comprise: responsive to determining that the number of QoS credits associated with the memory operation exceeds the available QoS credits, queuing the request to be processed at a subsequent scheduling time frame.

17. The method of claim 13, wherein the operations further comprise: resetting the number of available QoS credits for the traffic class at a subsequent scheduling time frame.

18. The method of claim 13, wherein the traffic class is one of: host read, host write, and background operation.

* * * * *